United States Patent [19]

Ogle, Jr.

[11] 4,351,358

[45] Sep. 28, 1982

[54] CHECK-VALVE CONSTRUCTION

[75] Inventor: Francis H. Ogle, Jr., Chardon, Ohio

[73] Assignee: Transamerica DeLaval Inc., Princeton, N.J.

[21] Appl. No.: 83,539

[22] Filed: Oct. 10, 1979

[51] Int. Cl.³ .............................................. F16K 15/03
[52] U.S. Cl. ................................. 137/512.1; 137/514
[58] Field of Search ................. 137/512.1, 527, 527.8, 137/514

[56] References Cited

U.S. PATENT DOCUMENTS

| 3,127,148 | 3/1964 | Collar | 137/527 X |
| 3,395,727 | 8/1968 | Weise et al. | 137/527 X |
| 3,412,754 | 11/1968 | Schou | 137/512.1 |
| 3,640,306 | 2/1972 | Vogt | 137/512.1 |
| 4,249,567 | 2/1981 | Weiss | 137/512.1 X |

FOREIGN PATENT DOCUMENTS 26783  9/1910  United Kingdom ............. 137/512.1

Primary Examiner—Robert G. Nilson
Attorney, Agent, or Firm—Hopgood, Calimafde, Kalil, Blaustein & Judlowe

[57] ABSTRACT

The invention contemplates a check-valve construction wherein a plurality of at least three generally triangular valve members are independently hinged to the respective base lines of a pyramidal seat configuration, the base lines being in a plane which essentially establishes the upstream end of the valve, and the apex of the pyramid (and, thus, the apex of each valve-member triangle) essentially establishes the downstream end of the valve.

4 Claims, 4 Drawing Figures

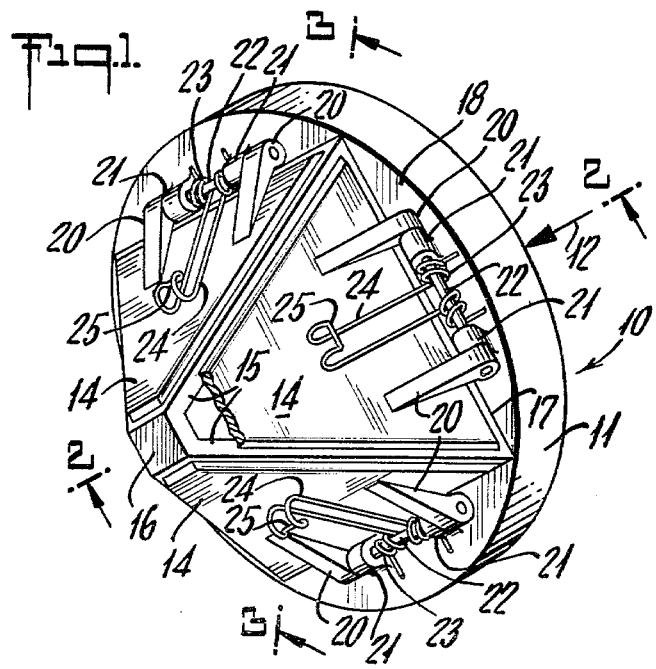
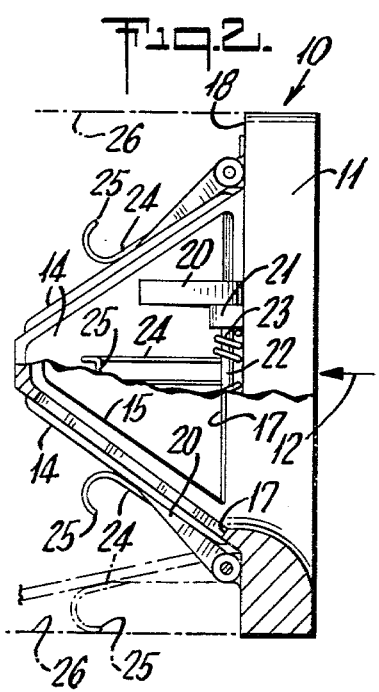
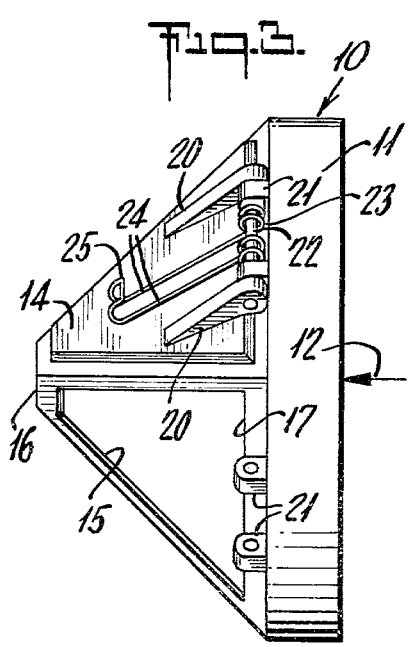
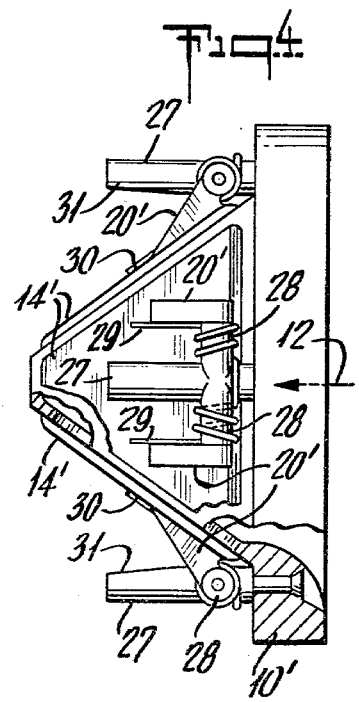

CHECK-VALVE CONSTRUCTION

BACKGROUND OF THE INVENTION

The invention relates to check valves of the variety in which plural like valve members are hinged at essentially a single radial plane in an annular valve body, for independent coaction with seat-post structure which may be secured to or formed integrally with the valve body.

In all such check valves known to me, the design philosophy is to provide the seat post structure for all valve members in essentially a single radial plane of the valve body, said plane being essentially in or slightly offset upstream from the radial plane of hinge action. It is an unavoidable consequence of such design philosophy that seat-post structure will locally reduce the open cross-sectional area available for fluid flow, and that valve-member motion between open and closed positions will be in the order of 90 degrees, unless up-stop measures are adopted to assure smaller displacements, thus further contributing to local restriction of the flow-handling capacity of the valve. Such large valve-member displacements can account for seating impacts of such severity as to materially reduce the expected service life of the valve.

SUMMARY OF THE INVENTION

It is an object of the invention to provide an improved check-valve construction, featuring little or no restriction to downstream flow, beyond such restriction as may be inherent in the bore dimensions of the valve body.

Another object is to achieve the above object with a construction having a valve-body thickness of minimum proportions, to enable selective installation of a check-valve function by inserted fitting of the valve in the bore of a conduit, pipe or hose fitting.

A general object is to achieve the foregoing objects with simple structure that is characterized by inherent low cost, ease of maintenance and long service life.

The invention achieves the foregoing and other objects and features by forming the seat structure in the general configuration of a regular geometrical pyramid wherein the base of the pyramid constitutes the upstream end and the apex of the pyramid is at the downstream end, the valve members being triangular to conform with and lap triangular seat openings, one for each side of the pyramid, and the valve members being hinged on their respective axes at a single radial plane of the valve-body bore, at or near the upstream end of the valve.

DESCRIPTION OF PREFERRED EMBODIMENTS

Preferred illustrative embodiments of the invention will be described in conjunction with the accompanying drawings, in which:

FIG. 1 is a partly broken-away, perspective view of a check valve of the invention, viewed from a downstream aspect;

FIG. 2 is a view in side elevation of the structure of FIG. 1, partly broken-away and in section at the alignment 2—2 of FIG. 1;

FIG. 3 is a view similar to FIG. 2, but taken at the alignment denoted 3 in FIG. 1; and FIG. 4 is a view similar to FIG. 2 to show a modification.

In FIGS. 1 to 3, the invention is shown in application to a check valve comprising a body 10 having a cylindrically annular outer surface 11 for accommodation in the bore of a conduit, pipe, fitting or the like; the check valve is designed to permit fluid flow through the bore of body 10 in the downstream direction denoted by arrow 12, and to establish a block against fluid flow in the opposite direction. Seat structure for a plurality of at least three valve members comprises a frame in the geometrical configuration of a pyramid which may be separately formed and then mounted to body 10 but which in the form shown is integrally formed with body 10. Also, for present illustration, the geometrical pyramid is square and establishes independent seating for each of four like valve members 14, one at each of the triangular sides of the pyramid.

More specifically, the seat structure comprises four seat-post legs 15 of equal length, which length exceeds the effective radius of the bore of body 10. Upstream ends of legs 15 are connected to body 10 at equal angular spacings in a single radial plane of body 10 (to define the base of the pyramid), and their downstream ends are interconnected at 16 (to define the apex of the pyramid). The seat opening between each pair of adjacent legs 15 is thus one of four isosceles triangles the base edge 17 of which is essentially a chord with respect to the bore of body 10. Each of the base edges 17 extends slightly downstream from an associated radial end face 18, to enable definition of a peripherally continuous seat for fully lapped accommodation of its associated valve member 14; each such end face 18 will be seen as a truncated sector defined essentially by a chord edge 17 and by the adjacent arc of surface 11 which it subtends. And the bore of body 10 is desirably faired, as shown in section in FIGS. 2 and 3, to adapt from the cylinder of surface 11 to the polygonal (square) opening defined by edges 17 at the base of the pyramid.

Hinging of all valve members 14 is on axes lying a single radial plane of the body bore, at or slightly downstream from the base plane of the pyramid. To this end, in FIGS. 1 to 3, each valve member 14 is formed with two spaced hinge arms 20 which are axially located by two spaced hinge lugs or bosses 21, formed with or mounted to the adjacent associated end face 18. A single pintel 22 extends through both arms 20 and both bosses 21, and wire-spring means 23 with coils around the pintel and located between lugs 21 has arms 24 applying constant resilient loading upon the associated member 14, in the valve-closing direction. The outer end of these arms is shown with a curved offset formation 25, serving an up-stop function upon contact with conduit-bore wall or the like 26 for the full-open condition of the valve, as suggested by phantom outlines in FIG. 2.

In the embodiment of FIG. 4, the hinging of each valve member 14' is via a downstream-directed hinge post or offset 27, permanently assembled to body 10' via the swaged reduced end of post 27. Short lateral offsets 28 further characterize post 27 and axially locate between hinge arms 20' of member 14', and a single pintel passes through both arms 20' and both offsets 28. Finally, a single wire spring has central reference to post 27 and spaced coils (located on offsets 28) with spaced end arms symmetrically apply resilient valve-closing force to the downstream side of the associated valve member 14'. Up-stop action is provided by a valve-member abutment 30 at contact with a suitable flat or truncation 31 at the downstream end of the associated hinge post 27.

It will be seen that the described invention meets all stated objects. In particular, valve-member displacement between open and closed positions is reduced to substantially less than 45 degrees, being a smaller angular displacement the greater the number of sides to the pyramid, for a pyramid of given base-diagonal and altitude proportions; in the disclosed forms, this total displacement is approximately 30 degrees, and the valve members cannot be subjected to the destructive closing impact (with attendant metal fatigue) which has characterized past constructions. Additionally, the employment of downstream-directed pyramidal seat framing provides at least as great (and preferably more) valve-open area as is represented by the effective bore or throat area of the body 10. In the four-member versions shown, this throat area is essentially determined by the largest square which can be tolerably designed within the outer cylindrical surface. For valves with greater numbers of valve members, involving base polygons with sides exceeding four, the throat area approaches the area within cylinder 11, but no matter what the number of valve members (triangular sides of the polygonal pyramid) the total valve-open area they collectively serve can always equal or exceed the throat area, due to the pyramid-seat concept of the invention.

While the invention has been described for the preferred forms shown, it will be understood that modifications may be made without departure from the claimed scope of the invention.

What is claimed is:

1. A check-valve assembly, comprising an annular valve body with a fluid-flow passage bore extending therethrough between upstream and downstream ends of said body, valve-seat formations including at least three seat-post legs of length exceeding the bore radius, said legs being connected to said body at angularly spaced locations and being connected to each other at a location on the downstream side of said body, whereby adjacent pairs of said legs define generally triangular seat openings to share flow via said passage, hinge means carried by said body at the base of each of said seat openings, separate valve members independently hinged to said body via the hinge means associated with each seat opening, said valve members having a valve-closing position in coaction with said seat formations for blocking fluid flow in the upstream direction and said valve members having a valve-open position for passage of fluid flow in the downstream direction, said legs being connected to the downstream end of said body and the downstream end of said body extending chordally between adjacent leg connections thereto, said hinge means at each opening comprising a hinge post extending downstream from the associated chordally extending portion of said body, spaced hinge arms on the associated valve member straddling the hinge post, and a pintel through said arms and hinge post.

2. The assembly of claim 1, wherein said hinge post includes integral opposed laterally extending offsets with aligned bores through which said pintel extends.

3. The assembly of claim 2, and including spring means urging each valve member to closed position, said spring means for each valve member comprising coils on each of said offsets and outer arms contacting the valve member at locations symmetrically offset from the hinge-post location.

4. The assembly of claim 1, wherein each spring means includes an arm resiliently contacting the downstream side of the associated valve member, said arm having a downstream-directed offset which is adapted to have upstop contact with a bore having substantially the outer-diameter dimension of said body.

* * * * *